United States Patent [19]

Kawai

[11] Patent Number: 5,200,625
[45] Date of Patent: Apr. 6, 1993

[54] X-RAY SPECTROMETER

[75] Inventor: Masao Kawai, Shiga, Japan

[73] Assignee: Shimadzu Corporation, Kyoto, Japan

[21] Appl. No.: 783,964

[22] Filed: Oct. 29, 1991

[30] Foreign Application Priority Data

Oct. 30, 1990 [JP] Japan .................. 2-293031

[51] Int. Cl.$^5$ ............................ G01T 1/17; G01T 1/36
[52] U.S. Cl. ....................................... 250/374
[58] Field of Search ............... 250/374, 261, 262, 369; 378/45, 48

[56] References Cited

U.S. PATENT DOCUMENTS

| 3,752,984 | 8/1973 | Scott et al. | 250/261 |
| 4,075,486 | 2/1978 | Sipila et al. | 250/374 |

FOREIGN PATENT DOCUMENTS

| 52-21392 | 6/1977 | Japan . | |
| 0200185 | 11/1983 | Japan | 250/369 |
| 61-68579 | 4/1986 | Japan . | |

OTHER PUBLICATIONS

Barr et al, "A Large-Area Transaction Radiation Detector", Nucl. Instr. & Meth. in Phys. Res., Sec A Sep., 1990, p. 465.

Kelly et al, "Automatic Compensation for Intensity Dependent Pulse Amplitude Shift in Gas Proportional X-Ray Detector", Conference: Soc. Applied Spec., Pub: Soc. Applied Spec. N.Y., N.Y. (1971), p. 96.

*Primary Examiner*—Constantine Hannaher
*Assistant Examiner*—Richard Hanig
*Attorney, Agent, or Firm*—Nikaido, Marmelstein, Murray & Oram

[57] ABSTRACT

An X-ray spectrometer is equipped with a pulse-height selector (pulse-height analyzer) for selecting pulse heights of amplified output pulses which fall within a specific range, and a counter for counting the output pulses selected by the pulse-height selector. A compensator which compensates for an energy shift in a proportional counter tube is provided between a linear amplifier, which amplifies the output pulses from the proportional counter tube, and a driving power supply of the proportional counter tube. The X-ray spectrometer has a main pulse-height selector for selecting the pulse height of output pulses from the proportional counter tube, and a subordinate pulse-height selector whose selective window width is within the window width of the main pulse-height selector. A shift in the pulse-height distribution of the output pulses from the proportional counter tube is determined from the counting rate of the subordinate pulse-height selector, the energy shift of the proportional counter tube is detected from the shift in the pulse-height distribution, and the driving power supply of the proportional counter tube is controlled so as to eliminate the shift in the pulse-height distribution of the output pulses from the proportional counter tube, thereby compensating for the effects of the energy shift. The difference or ratio between detection values obtained from the plurality of subordinate pulse-height selectors is determined to obtain a feedback signal, and the driving power supply of the proportional counter tube is driven by this feedback signal.

13 Claims, 7 Drawing Sheets

X-RAY SPECTROMETER

BACKGROUND OF THE INVENTION

This invention relates to wavelength-dispersive X-ray specrometer used in combination with a proportional counter tube.

Electromagnetic analysis is used to extract chemical information indicative of a substance through phenomena such as light emission, absorption, reflection, fluorescence, phosphorescence, scattering, diffraction and optical rotation, which occur as the result of an interaction between electromagnetic waves and the substance. Examples of electromagnetic analysis in which the wavelength region of the electromagnetic waves of interest is the X-ray region include fluorescent X-ray analysis (XRF) using X-rays as the source of excitation, EPMA using an electron beam narrowed down to less than one micrometer, and PIXE using a charged-particle beam such as a proton or helium-ion beam.

Characteristic X-rays, which are specific to an element, are emitted from a specimen excited by irradiation, and the X-rays are separated into spectral components by an analyzing crystal and then detected by a detector. A counting mechanism for counting the characteristic X-rays detected usually is provided with an amplifier for amplifying output pulses from the detector, a pulse-height selector (also referred to as a pulse-height analyzer) for selecting those amplified output pulses which have peak values within a specific range, and a counter for counting the output pulses selected by the pulse-height selector.

A gas-filled detector such as a proportional counter tube is used as the detector and operates when a high-voltage is applied thereto. With a detector of this kind, an increase in the strength of the entrant X-rays enlarges the amount of space charge within the detector so that there is a decrease in the effective detector voltage. This brings about a phenomenon referred to as an energy shift, in which there is a decrease in the peak value of the detector output pulse. When the energy shift occurs, the output pulses not selected by the pulse-height selector increase in number even if they are output pulses of the characteristic X-rays indicative of the element of interest, and hence there is an increase in the number of pulses which fail to be counted. This means that the relationship between X-ray intensity and pulse counting rate is no longer linear. The problem that results is a decline in analytical accuracy. In addition, the detector fluctuates due to a fluctuation in the high-voltage power supply and in accordance with the passage of time and temperature, and drift develops as a result.

Accordingly, it is necessary to apply a correction to the counting rate that has actually been measured. The simplest methods of applying this correction according to the prior art include a method which involves taking the energy shift into consideration and, if there is a shift in the pulse-height distribution, setting the window of the pulse-height selector to be large enough so that the entire distribution will fall within this window. Another simple method used when the range of intensities of measured X-rays is unspecified involves investigating the relationship between X-ray intensity and energy shift by actual measurement to obtain a correction function in advance, and automatically controlling the gain of the measurement system by this correction function when a specimen is measured. According to these methods, the window of the pulse-height selector is set to be large. A disadvantage which results is a corresponding increase in noise and a decline in measurement sensitivity. In addition, there is no assurance that the energy shift of the counter tube will be constant over an extended period of time, and the reliability of quantitative measurement is unsatisfactory.

Further, the conventional fluorescent X-ray spectrometer includes one in which the output end of the pulse-height selector is separately provided with a counting rate meter, and a high-voltage generator is controlled by the output signal from the counting rate meter in such a manner that the high voltage applied to the detector is corrected in conformity with X-ray intensity. In this conventional fluorescent X-ray spectrometer, the counting rate meter for controlling the high voltage of the detector is provided for output pulses which have passed through the pulse-height selector. As a consequence, all of the output pulses from the detector are not counted; only the output pulses of a target energy are counted.

On the other hand, the energy shift of a detector is dependent upon the strength of all X-rays that impinge upon the detector and is decided by the ionization count of the gas within the detector. Accordingly, though the high-voltage correction of the detector is applied with regard to X-rays of the target energy in the conventional fluorescent X-ray spectrometer, no correction is applied for X-rays of a non-essential energy. Consequently, in a case where there are many non-essential X-rays, a problem which arises is that the high-voltage correction of the detector is rendered inadequate and an improvement in analytical precision cannot be achieved.

A probe for fluorescent X-ray measurement having means for varying the magnitude of the high voltage supplied to the detector and adjusting the energy output of the detector to thereby maintain the stability of the apparatus has been disclosed in the specification of Japanese Patent Publication No. 52-21392. In this apparatus, the output end of an amplifier is provided anew with a high-level discriminator separate from a pulse-height selector in order to correct the high voltage of the detector with regard to all output pulses from the detector, and the high voltage applied to the detector is corrected by the output signal from the high-level discriminator. As a result, the apparatus has a more complicated mechanism and circuitry and the cost thereof is raised. In addition, a problem which remains unsolved is that the effects of the high-voltage correction due to higher order diffraction lines cannot be corrected for by the level discriminator.

Further, in the specification of Japanese Patent Application No. 59-191256 (Japanese Patent Application Laid-Open No. 61-68579) filed for patent by the present applicant on Sep. 11, 1984, there is disclosed an X-ray spectrometer which counts not only X-rays of a target energy but also X-rays of a non-essential energy to correct the high voltage applied to the detector and prevent the inconveniences caused by energy shift. This apparatus possesses two counting modes, namely a regular count for analytical counting and a preliminary count for correcting the applied voltage of the detector prior to the regular count.

In the preliminary counting mode, the upper-limit level of the pulse-height selector is raised and its lower-limit level is lowered by means for setting the level of the pulse height selector, all output pulses are counted, and the high-voltage applied to the detector is corrected by the set voltage value of high-voltage setting means stored in memory means as a memorized value extracted based upon the value of the count.

In the regular counting mode, the upper- and lower-limit levels of the pulse-height selector are returned to the normal levels for analytical counting and the high voltage corrected by the preliminary count is applied to the detector so that the latter may carry out X-ray detection. Though this method can be said to be an improvement on the above-described method of investigating the relationship between X-ray intensity and energy shift by actual measurement to obtain a correction function in advance, and automatically controlling the gain of the measurement system by this correction function when a specimen is measured, time is required in order to perform the preliminary count prior to the regular count, and another drawback is that real-time control cannot be carried out.

Accordingly, a first object of the present invention is to narrowly set the width of the window of a pulse-height selector, which selects the pulse height of output pulses from a proportional counter tube in an X-ray spectrometer, in conformity with the X-ray wavelength to be measured, and detect in real-time an energy shift in a measurement output when a specimen is measured, thereby making it possible to correct the measurement output.

A second object of the present invention is to reduce the number of output pulses not selected by a pulse-height selector owing to an energy shift in a measurement output of an X-ray spectrometer, thereby eliminating situations in which output pulses go uncounted and establishing a linear relationship between X-ray intensity and pulse counting rate so that the accuracy of analysis is improved.

A third object of the present invention is to compensate for a fluctuation in a high-voltage power supply and a fluctuation caused by the passage of time and a variation in temperature in an X-ray spectrometer.

A fourth object of the present invention is to perform an effective correction of the high voltage of a detector in an X-ray spectrometer even when there are many non-essential X-rays, thereby making possible an improvement in analytical accuracy.

A fifth object of the present invention is to construct an X-ray spectrometer of simple mechanisms and circuitry, in which a correction function is not obtained by interrupting a measurement in progress and previously investigating, through actual measurement, the relationship between X-ray intensity and energy shift.

Other objects and advantages of the present invention will be apparent from the following description taken in conjunction with the accompanying drawings, in which like reference characters designate the same or similar parts throughout the figures thereof.

SUMMARY OF THE INVENTION

An X-ray spectrometer according to the present invention has a main pulse-height selector for selecting the pulse height of output pulses from a proportional counter tube, and a subordinate pulse-height selector whose selective window width is within the window width of the main pulse-height selector. A shift in the pulse-height distribution of the output pulses from the proportional counter tube is determined from the counting rate of the subordinate pulse-height detector, the energy shift of the proportional counter tube is detected from the shift in the pulse-height distribution, and a driving power supply of the proportional counter tube is controlled so as to eliminate the shift in the pulse-height distribution of the output pulses from the proportional counter tube, thereby compensating for the effects of the energy shift.

In a preferred embodiment, the subordinate pulse-height selector in the X-ray spectrometer of the present invention comprises a plurality of pulse-height selectors whose selective window widths are pulse-height widths at least at the upper and lower ends of each of pulse-height widths obtained by dividing the window width, which has been set for the main pulse-height selector, into n equal portions. The difference or ratio between detection values obtained from the plurality of subordinate pulse-height selectors is determined to obtain a feedback signal, and the driving source of the proportional counter tube is driven by this feedback signal.

DESCRIPTION OF THE PREFERRED EMBODIMENTS

Embodiments of the present invention will now be described in detail while referring to the drawings.

Figure 1:
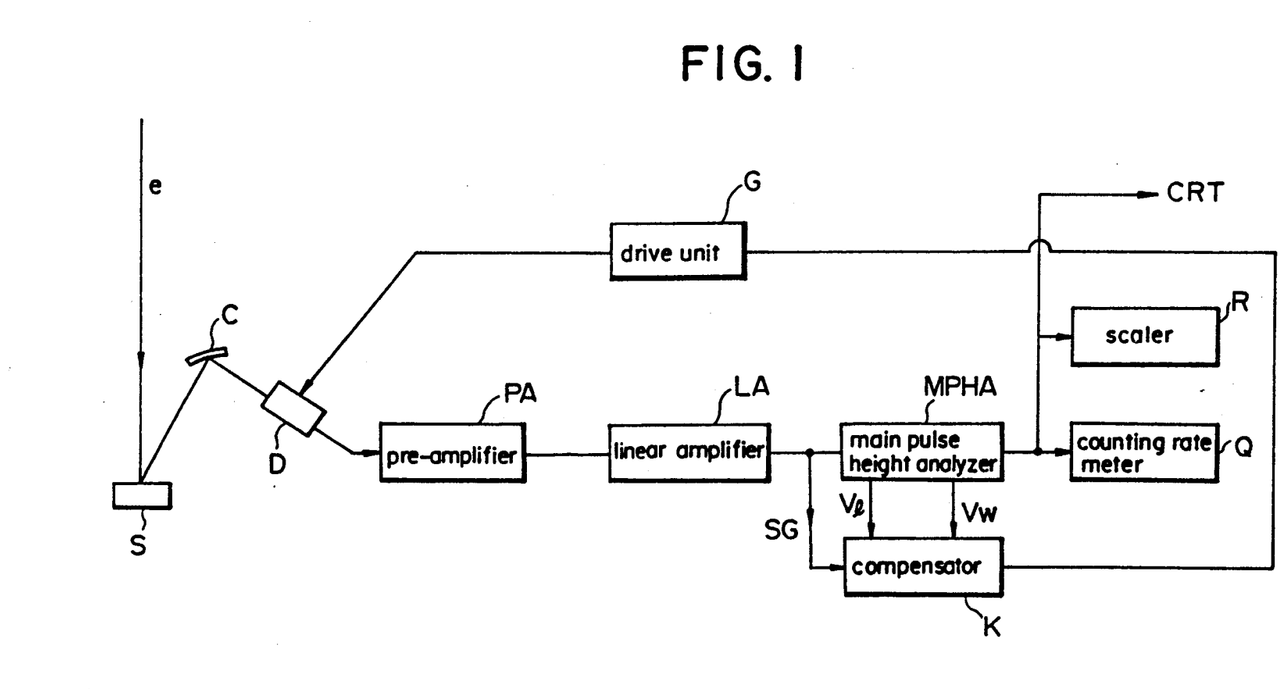
FIG. 1 is a block diagram showing the overall construction of an embodiment of an X-ray spectrometer according to the present invention.

FIG. 1 is a block diagram showing the overall construction of a wavelength-dispersive X-ray spectrometer in combination with a proportional counter tube. In FIG. 1, an electron beam is illustrates as an example of an irradiating electromagnetic wave. When a specimen S is irradiated with an electron beam e, part of the beam is scattered and diffracted and part is absorbed to generate characteristic X-rays. The characteristic X rays, which are indicative of various elements, emitted from the specimen S are separated into spectral components by an analyzing crystal C, and the characteristic X-rays of an element to be detected are selected. The characteristic X-rays separated into spectral components by the analyzing crystal C are converted into an electrical signal by an X-ray detector D. The output signal from a proportional counter tube is a pulsed signal, which is sent to a preamplifier PA. The output signal from the preamplifier PA is delivered at a low output impedance to a linear amplifier LA, which sends a pulsed signal proportional to the input signal to a main pulse-height analyzer MPHA, which is the next stage. A clipping circuit and a pulse forming circuit (neither of which are shown) are inserted in the linear amplifier LA to uniformalize the shape of the pulses in order to prevent pulse pile up, which is due to arrival of a succeeding pulse before the preceding pulse is sufficiently attenuated, as well as amplifier overload caused by pulse pile-up.

The main pulse-height analyzer effects separation into background, such as higher order diffraction lines of characteristic X-rays and higher order diffraction lines of primary X-rays from the specimen, which are detected at the same angle in the analyzing crystal, and a characteristic X-ray spectrum of the element undergoing detection. The output signal from the main pulse-height analyzer MPHA is sent to a counter, which counts the pulses one at a time and displays the count, or to a counting rate meter, which displays an average count per second. The display is presented by a display device such as a CRT.

A compensator K is a principal constituent of the present invention. Information indicating the size of a window set in the main pulse-height analyzer MPHA is inputted to the compensator K, to which the pulsed output signal of the linear amplifier LA is applied. The compensator K is adapted to detect the energy shift of the output pulses from the proportional counter tube D, send this detection signal to a drive unit G of the proportional counter tube so as to control the voltage applied to the proportional counter tube D, and perform feedback in such a manner that the energy shift returns to zero.

The state of energy shift will be described with reference to FIG. 4, in which the horizontal axis indicates the pulse height of output pulses from the proportional counter tube when X-rays of a certain fixed wavelength impinge thereon, and the vertical axis indicates the counting rate, namely the frequency of occurrence, of each pulse height. The window of the main pulse-height analyzer MPHA is set at $W_0$. The curve indicated by the solid line is a pulse-height distribution curve which prevails when incident X-ray intensity has a low value, and the curve indicated by the dashed line is a pulse-height distribution curve which prevails when incident X-ray intensity has a high value. When the incident X-ray intensity takes on a high value with regard to X-rays having the same energy, namely the same wavelength, the amount of space charge within the detector becomes large, the effective voltage of the detector decreases and there is a reduction in the pulse-height value of the detector output. As a result, the pulse-height distribution shifts horizontally so that there is a decline in apparent X-ray intensity (the area within the width $W_0$ of the distribution curve).

Figure 4:
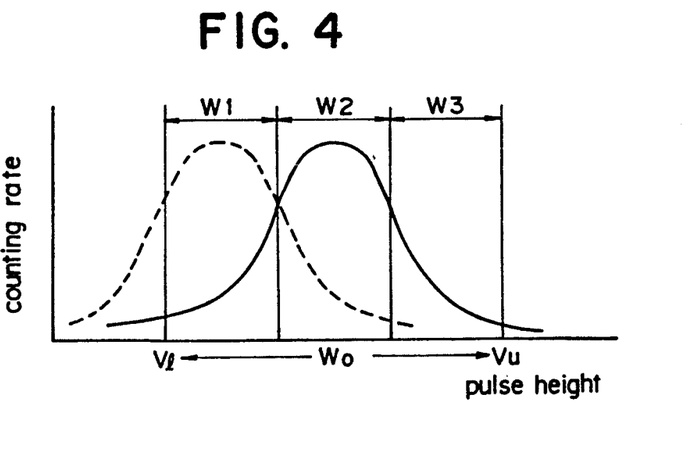
FIG. 4 is a diagrammatic view showing the output waveform of a proportional counter tube according to the present invention.

In an embodiment of the present invention, a plurality of subordinate pulse-height analyzers SPHA are provided in addition to the main pulse-height analyzer MPHA, the windows of these subordinate pulse-height analyzers are set at $W_1$, $W_2$, $W_3$, which are obtained by dividing $W_0$ by three, as shown in FIG. 4, and the output pulses from the proportional counter tube D are applied to the main and subordinate pulse-height analyzers simultaneously. As a result, when the pulse-height distribution indicated by the solid line in FIG. 4 prevails, the counting rate of the pulses which have passed through the window $W_2$ are maximum and the counting rates of the pulses which have passed through the windows $W_1$, $W_3$ are approximately equal to each other and small. When the pulse-height distribution shifts as indicated by the dashed line, the counting rate for $W_1$ becomes larger than that for $W_3$, and the counting rate for the central window $W_2$ also declines. Since the size of the energy shift is thus ascertained by the change in the mutual relationship among the counting rates of the pulses which have passed through the windows $W_1$ through $W_3$, it is possible to compensate for the effects of the energy shift with respect to the counting rate of the output pulses from the main pulse-height analyzer MPHA. This method of compensation can employ any means based upon an ordinary technique.

The compensator K will be described in detail with reference to FIG. 2. The compensator K has two subordinate pulse-height analyzers SPHA 1, 2. A lower limit $V_1$ of the window of the main pulse-height analyzer MPHA and the value of window width $V_W$ are inputted to the subordinate pulse-height analyzers SPHA 1, 2 from the main pulse-height analyzer MPHA. The lower limit $V_1$ of the window and the value of window width $V_W$ are added by an adding circuit 3 to set an upper-limit level $V_U$ of the subordinate pulse-height analyzer SPHA 1, and the window width $V_W$ is potentially divided by n in a potentiometer 4 to obtain $V_W/n$. The window width of the subordinate pulse-height analyzer SPHA 1 is set by $V_W/n$ thus obtained. As for the subordinate pulse-height analyzer SPHA 2, its lower-limit level $V_1$ is set by the lower limit $V_1$ of the window, and its window width is set by $V_W/n$, which is obtained by potentially dividing $V_W$ by n in the potentiometer 4. The output pulse signal of the linear amplifier LA, which is the same as that inputted to the main pulse-height analyzer MPHA, is applied to the two subordinate pulse-height analyzers SPHA 1, 2. Pulses which have passed through the window corresponding to $W_3$ in FIG. 4 are inputted to a frequency/voltage converter 5 from the subordinate pulse-height analyzer SPHA 1. Similarly, output pulses from the subordinate pulse-height analyzer SPHA 2 are inputted to a frequency/voltage converter 6. The frequency/voltage converters 5, 6 output voltages proportional to the counting rates of the respective input pulses. When the difference between these two outputs is zero, the pulse-height distribution of the output pulses from the proportional counter tube D falls, with left-right symmetry, in the center of the window set for the main pulse-height analyzer MPHA. If there is an energy shift, the above-mentioned difference possesses a positive or negative value. Numeral 7 in FIG. 2 denotes a subtracting circuit for calculating the difference between the outputs of the frequency/voltage converters 5, 6. The output of the subtracting circuit 7 is delivered to the drive unit G of the proportional counter tube D, and feedback is performed in such a manner that the above-mentioned difference becomes zero.

In the embodiment described above, the setting of the upper-limit level $V_u$, lower-limit level $V_1$ and window widths of the subordinate pulse-height analyzers SPHA 1, 2 is performed based upon the lower limit $V_1$ and the value of the window width $V_w$ of the main pulse-height analyzer MPHA, which are inputted from the main pulse-height analyzer. However, this setting can be made based upon other values as well. Other methods of setting the upper-limit level $V_u$, lower-limit level $V_1$ and window widths of the subordinate pulse-height analyzers SPHA 1, 2 will be described with reference to FIGS. 5 through 8.

Figure 5:
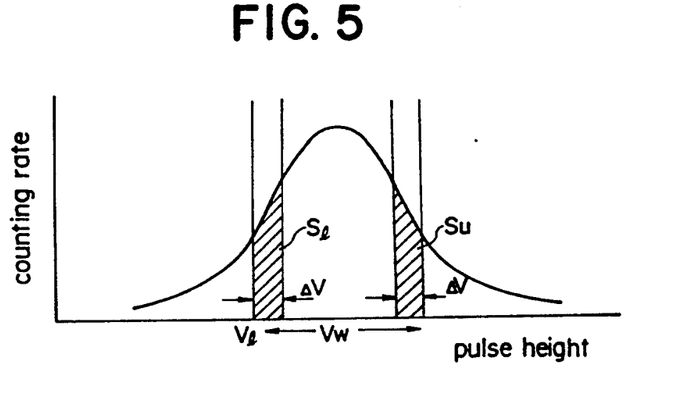
FIGS. 5, 6, 7 and 8 are diagrams showing methods of setting windows of subordinate pulse-height analyzers in the compensator of the present invention.

In FIG. 5, the lower limit $V_1$ of the window of the main pulse-height analyzer MPHA and the value of its window width $V_W$ are inputted from the main pulse-height analyzer MPHA, and the sum of the lower limit $V_1$ of the window and the value of the window width $V_W$ is calculated, thereby setting the upper-limit level $V_u$ of the subordinate pulse-height analyzer SPHA 1. The lower-limit level $V_1$ of the subordinate pulse-height analyzer SPHA 2 is set based upon lower limit $V_1$ of the window. The window widths of the subordinate pulse-height analyzers SPHA are set by inputting a separate $\Delta V$. The outputs of the frequency/voltage converters 5, 6 which have passed through the windows of the subordinate pulse height analyzers SPHA 1, 2 in this case are the portions represented by $S_u$, $S_1$, respectively.

Figure 6:
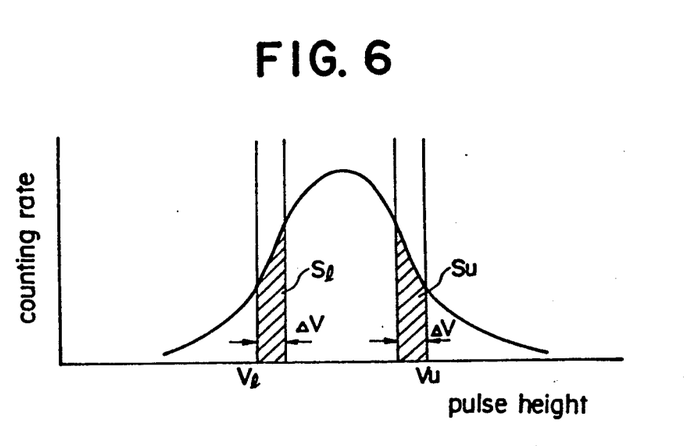

In FIG. 6, the upper limit $V_U$ and the lower limit value $V_1$ of the window of the main pulse-height analyzer MPHA are inputted from this analyzer, the upper-limit level $V_U$ and lower-limit level $V_1$ of the subordinate pulse-height analyzers SPHA 1, 2 are set, and the window widths of the subordinate pulse-height analyzers SPHA are set by inputting a separate $\Delta V$. The outputs of the frequency/voltage converters 5, 6 which have passed through the windows of the subordinate pulse-height analyzers SPHA 1, 2 in this case are the portions represented by $S_u$, $S_1$, respectively.

Figure 7:
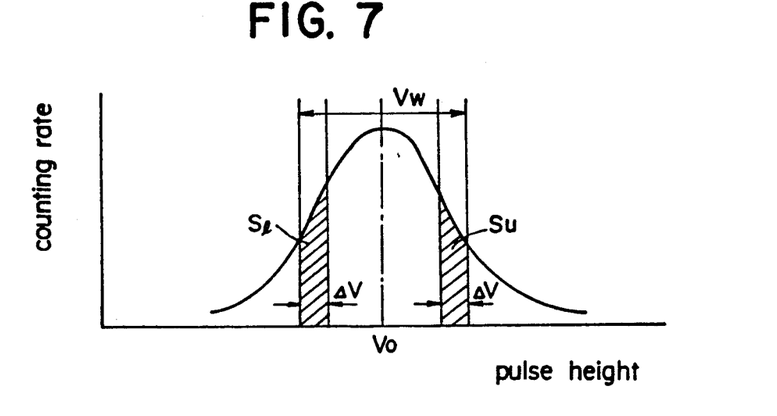

In FIG. 7, the average value $V_0$ and the value of the window width $V_W$ of the main pulse-height analyzer MPHA are inputted from this analyzer, and ½ of the window width $V_W$ is added to the average value $V_0$, thereby setting the upper-limit level $V_U$ of the subordinate pulse-height analyzer SPHA 1. Next, ½ of the window width $V_W$ is subtracted from the average value $V_0$, thereby setting the lower-limit level $V_1$ of the subordinate pulse-height analyzer SPHA 2. The window widths of the subordinate pulse-height analyzers SPHA are set by inputting a separate $\Delta V$. The outputs of the frequency/voltage converters 5, 6 which have passed through the windows of the subordinate pulse-height analyzers SPHA 1, 2 in this case are the portions represented by $S_u$, $S_1$, respectively.

Figure 8:
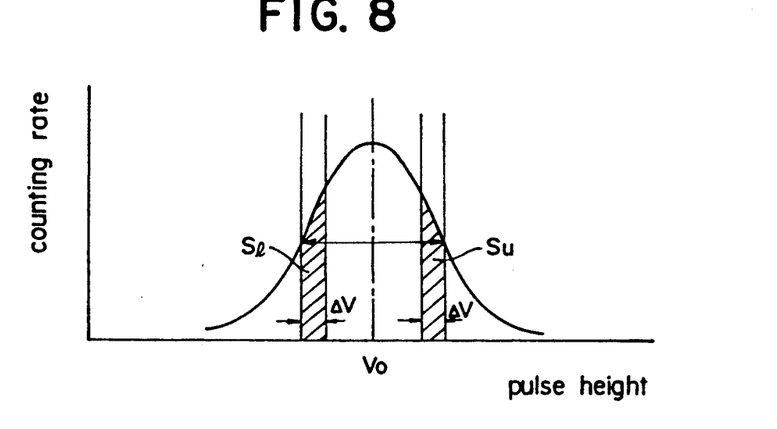

In FIG. 8, the average value $V_0$ of the main pulse-height analyzer MPHA is inputted from this analyzer, and half of the half-value width is added to the average value $V_0$, thereby setting the upper-limit level $V_U$ of the subordinate pulse-height analyzer SPHA 1 and the lower-limit level $V_1$ of the subordinate pulse-height analyzer SPHA 2. The window widths of the subordinate pulse-height analyzers SPHA are set by inputting a separate $\Delta V$. The outputs of the frequency/voltage converters 5, 6 which have passed through the windows of the subordinate pulse-height analyzers SPHA 1, 2 in this case are the portions represented by $S_u$, $S_1$, respectively.

Figure 9:
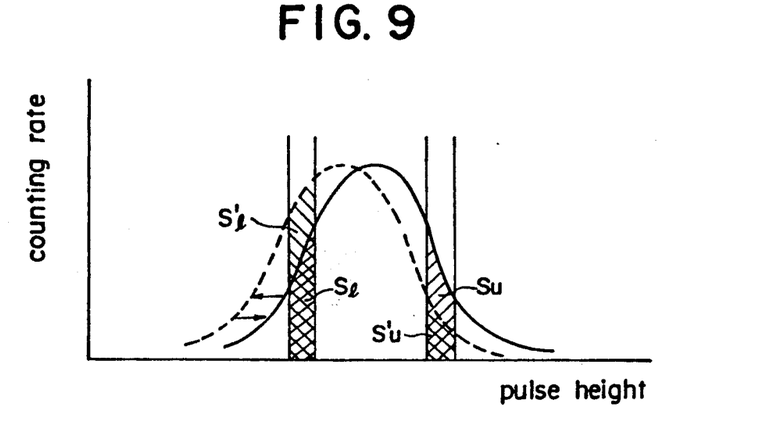
FIGS. 9, 10, 11 and 12 are diagrams showing the state of feedback in the compensator of the present invention.

FIG. 9 is a diagram showing the state of feedback of the pulse-height distribution of the main pulse-height analyzer MPHA. This is the result of the operation of the compensator. In FIG. 9, the solid line indicates the normal pulse-height distribution. The dashed line indicates that the pulse-height distribution is offset to the left, namely toward the side of lower pulse height, owing to an energy shift. Among the four straight lines in the vertical direction, the two straight lines on the left side form the window of the subordinate pulse-height analyzer SPHA 2, and the two straight lines on the right side form the window of the subordinate pulse-height analyzer SPHA 1. The area of the pulse-height distribution represented by the dashed line selected by the window of the subordinate pulse-height analyzer SPHA 2 is $S_1'$, and the area of the pulse-height distribution represented by the dashed line selected by the window of the subordinate pulse-height analyzer SPHA 1 is $S_U'$. Upon comparing $S_1'$ and $S_U'$, feedback is applied to the drive unit G of the proportional counter tube to move the pulse-height distribution to the right, namely toward higher pulse heights, until the area of the pulse-height distribution represented by the solid line selected by the window of the subordinate pulse-height analyzer SPHA 2 becomes equal to $S_1$ and the area of the pulse-height distribution represented by the solid line selected by the window of the subordinate pulse-height analyzer SPHA 1 becomes $S_U$. As a result, a compensation is applied for energy shift.

Figure 3:
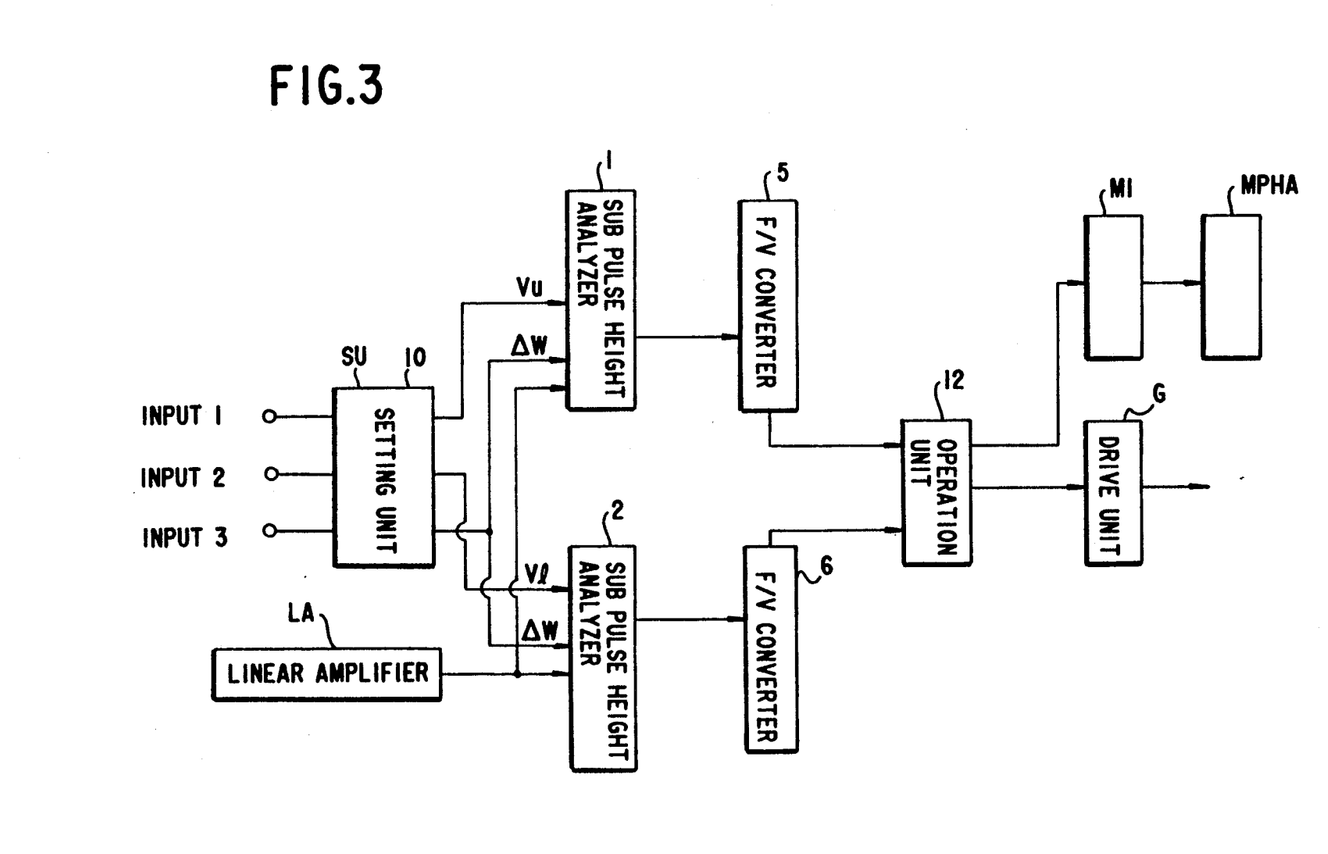
FIG. 3 is a circuit diagram showing another embodiment of the compensator according to the present invention.

FIG. 3 is a circuit diagram illustrating another embodiment of the compensator according to the present invention. The compensator according to the invention shown in FIG. 3 has at least two subordinate pulse-height analyzers SPHA 1, 2, to which the proportional counter tube D is inputted via the linear amplifier LA. The subordinate pulse-height analyzers SPHA 1, 2 have their windows set via a setting unit SU 10. The outputs of the subordinate pulse-height analyzers SPHA 1, 2 are converted into voltage signals by the frequency/voltage converters 5, 6, respectively, the voltage signals are processed by an operation unit 12, and the output of the operation unit 12 is fed back to the drive unit G of the proportional counter tube.

The setting of the windows of the subordinate pulse-height analyzers SPHA 1, 2 by the setting unit SU 10 is performed in the manner shown in FIGS. 2, 5, 6, 7 and 8 based upon inputs 1, 2 and 3.

Figure 2:
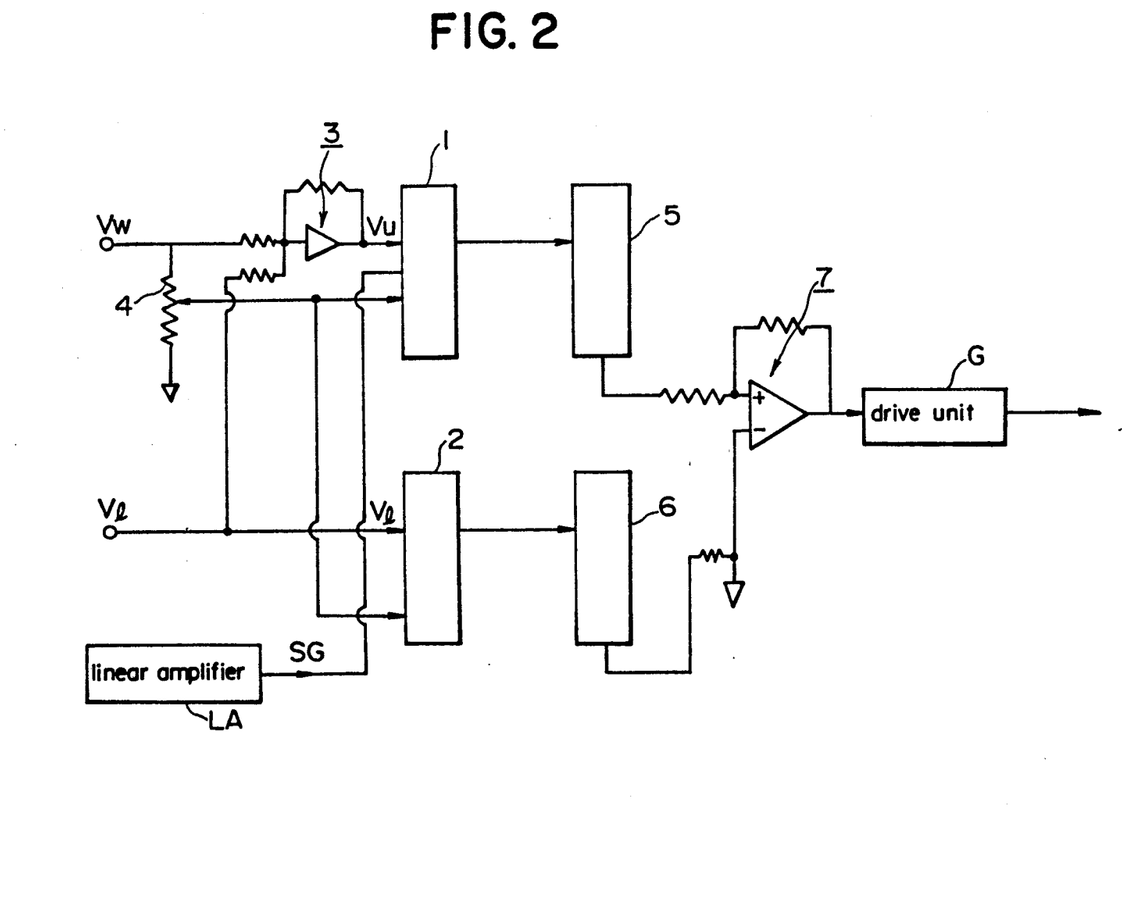
FIG. 2 is a circuit diagram showing an embodiment of a compensator according to the present invention.

The mode of signal processing executed by the operation unit 12 is for finding the difference between the outputs of the subordinate pulse-height analyzers SPHA 1, 2, as illustrated in the embodiment of FIG. 2. Another mode of signal processing executed by the operation unit 12 is for finding the ratio between the outputs of the subordinate pulse-height analyzers SPHA 1, 2. Feedback is applied to the drive unit G of the proportional counter tube in such a manner that the ratio between the outputs becomes one. Though the aforesaid processing employs two subordinate pulse-height analyzers, it is possible to perform the processing by using one subordinate pulse-height analyzer and make a comparison with a preset value. This embodiment is illustrated in FIGS. 10, 11, 12 and 13.

Figure 13:
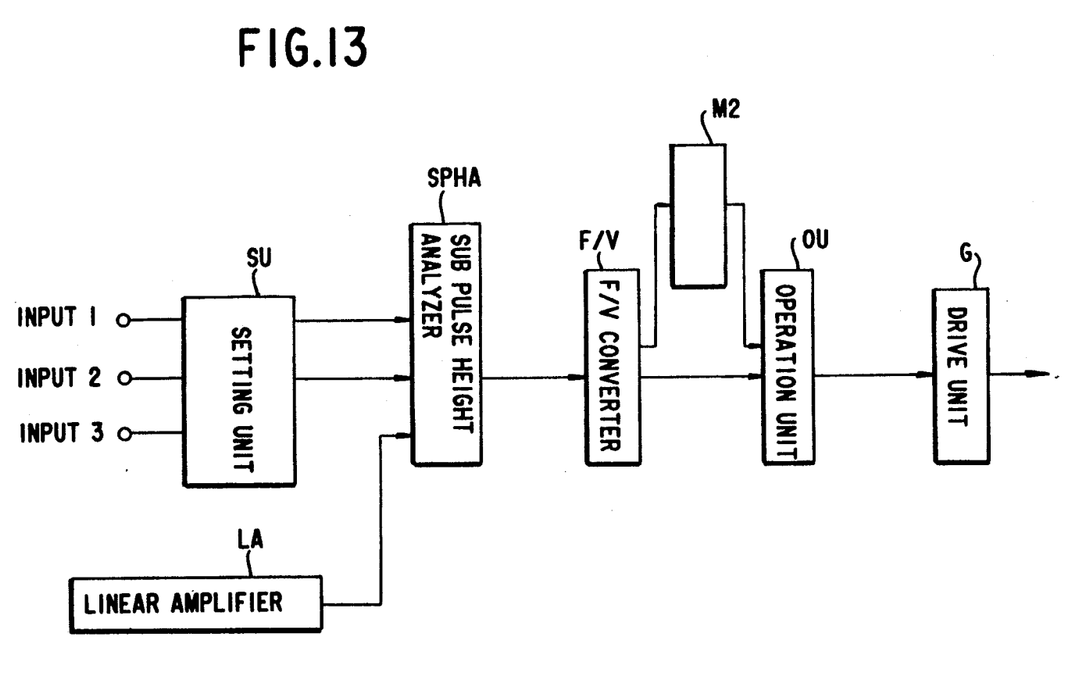
FIG. 13 is a circuit diagram illustrating yet another embodiment of a compensator according to the present invention.

Unlike the embodiment of FIG. 3, the embodiment shown in FIG. 13 employs one subordinate pulse-height analyzer, and a memory M2 is provided between a frequency/voltage converter F/V and an operation unit OU. This embodiment is practiced by comparing the output obtained via the window set for the single subordinate pulse-height analyzer SPHA with a set value preset in a window the same as that of the subordinate pulse-height analyzer SPHA or with a set value measured via the subordinate pulse-height analyzer SPHA.

Figure 10:
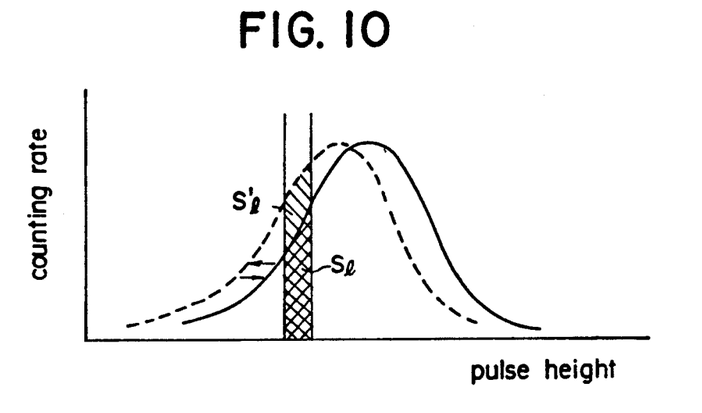
Figure 11:
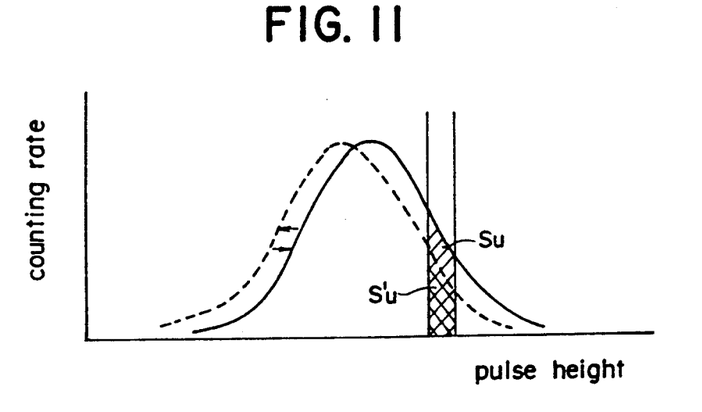
Figure 12:
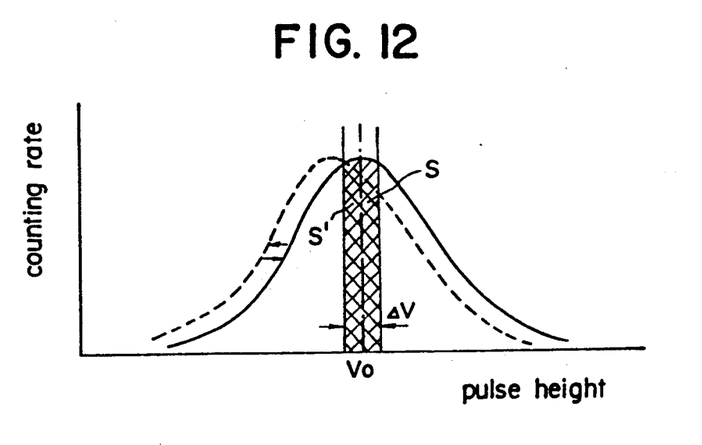

The manner in which the foregoing is carried out is shown in FIGS. 10, 11 and 12. FIG. 10 is for a case where only the subordinate pulse-height analyzer SPHA 2 of FIG. 3 is provided. In this case, the area $S_1$ of the pulse-height distribution represented by the solid line selected by the window of the subordinate pulse-height analyzer SPHA is set in advance or is measured in advance and then stored in the memory M2. The area $S_1'$ of the pulse-height distribution represented by the dashed line selected by the window of the subordinate pulse height analyzer SPHA is compared, by means of the operation unit OU, with the value that has been stored in the memory M2, and feedback is applied to the drive unit G of the proportional counter tube in the same manner as described above.

FIG. 11 is for a case where only the subordinate pulse-height analyzer SPHA 1 of FIG. 3 is provided. In this case, the area $S_U$ of the pulse-height distribution represented by the solid line selected by the window of the subordinate pulse-height analyzer SPHA is set in advance or is measured in advance and then stored in the memory M2. The area $S_U'$ of the pulse-height distribution represented by the dashed line selected by the window of the subordinate pulse-height analyzer SPHA is compared, by means of the operation unit OU, with the value that has been stored in the memory M2, and feedback is applied to the drive unit G of the proportional counter tube in the same manner as described above.

FIG. 12 is for a case where the window of the subordinate pulse-height analyzer SPHA is set in the vicinity of the average value of the pulse-height distribution represented by the solid line. In this case, the area S of the pulse-height distribution represented by the solid line selected by the window of the subordinate pulse-height analyzer SPHA is set in advance or is measured in advance and then stored in the memory M2. The area $S_U'$ of the pulse height distribution represented by the dashed line selected by the window of the subordinate pulse-height analyzer SPHA is compared, by means of the operation unit OU, with the value that has been stored in the memory M2, and feedback is applied to the drive unit G of the proportional counter tube in the same manner as described above.

In FIG. 12, it is also possible to apply feedback to the drive unit G of the proportional counter tube in such a manner that the operation unit OU takes the maximum value of the area S of the pulse-height distribution represented by the solid line selected by the window of the subordinate pulse-height analyzer SPHA. The memory M2 can be deleted in such case.

The mode of execution is such that the pulse-height distribution of the signal pulses from the proportional counter tube is a normal distribution (Gaussian distribution) decided by an average and standard deviation. If this distribution according to the invention is adopted, it is considered that an evaluation can be made based upon an average.

With reference again to FIG. 3, the example of the aforementioned mode of execution is such that the voltage of the drive unit G of the proportional counter tube is controlled by feedback to return the X-ray detection pulse-height distribution per se to the standard position. However, it is permissible to adopt an arrangement in which a table is previously prepared which gives the relationship between the ratio of the counting rates of subordinate pulse-height analyzers SPHA 1, 2, namely the ratio of the outputs of the frequency/voltage converters 5, 6 (by performing a logarithmic conversion and obtaining the difference between the results), and correction coefficients by which the counting rate of the output pulses from the main pulse-height analyzer MPHA is to be multiplied. The table is stored beforehand in memory 1 and a compensation is made with regard to the counting rate of the output pulses from the main pulse-height analyzer MPHA. This method is useful in a case where the entirety of the X-ray spectrometer is controlled by a computer and data processing also is executed by the same computer.

In accordance with the present invention, as described in detail above, the following advantages can be obtained:

(1) The width of the window of a pulse-height selector, which selects the pulse height of output pulses from a proportional counter tube in an X-ray spectrometer, is set narrowly in conformity with the X-ray wavelength to be measured, and an energy shift in a measurement output is detected in real-time when a specimen is measured, thereby making it possible to correct the measurement output.

(2) The number of output pulses not selected by a pulse-height selector owing to an energy shift in a measurement output of an X-ray spectrometer is reduced, thereby eliminating situations in which output pulses go uncounted and establishing a linear relationship between X-ray intensity and pulse counting rate so that the accuracy of analysis is improved.

(3) A fluctuation in a high-voltage power supply and a fluctuation caused by the passage of time and a variation in temperature can be compensated for in an X-ray spectrometer.

(4) An effective correction of the high voltage of a detector in an X-ray spectrometer is performed even when there are many non-essential X-rays, thereby making possible an improvement in analytical accuracy.

(5) An X-ray spectrometer is constructed of simple mechanisms and circuitry, in which a correction function is not obtained by interrupting a measurement in progress and previously investigating, through actual measurement, the relationship between X-ray intensity and energy shift.

As many apparently widely different embodiments of the present invention can be made without departing from the spirit and scope thereof, it is to be understood that the invention is not limited to the specific embodiments thereof except as defined in the appended claims.

What is claimed is:

1. An X-ray spectrometer, which comprises:
    (a) a main pulse-height selector for selecting the pulse height of output pulses from a proportional counter tube;
    (b) means for counting the output pulses and converting them into a signal indicative of X-ray intensity; and
    (c) a compensator for compensating for the effects of an energy shift in said proportional counter tube in real-time when a specimen is measured;
    said compensator including:
    (i) a subordinate pulse-height selector having a window set within the range of the width of a window of said main pulse-height selector; and
    (ii) an operation unit for generating a signal which controls a driving power supply of said proportional counter tube to an arbitrary level by said subordinate pulse-height selector.

2. The spectrometer according to claim 1, wherein said subordinate pulse-height selector comprises a plurality of pulse-height selectors, in which the width of the window of said main pulse-height selector is partitioned into a plurality of parts, and at least a portion contiguous to an upper limit of said window and a portion contiguous to a lower limit of said window define the windows of said plurality of subordinate pulse-height selectors.

3. The spectrometer according to claim 2, wherein an upper-limit level of the window of a first subordinate pulse-height selector of said plurality of subordinate pulse-height selectors is set by addition of a lower-limit value of the window of said main pulse-height selector and the window width of the window of said main pulse-height selector; a lower-limit level of the window of a second subordinate pulse height selector is set by the lower-limit value of the window of said main pulse-height selector; the window widths of the windows of said first and second subordinate pulse-height selectors are capable of being set at will; and said operation unit obtains a value corresponding to the difference between output values from said first and second subordinate pulse-height selectors.

4. The spectrometer according to claim 2, wherein an upper-limit level of the window of a first subordinate pulse-height selector of said plurality of subordinate pulse-height selectors is set by addition of a lower-limit value of the window of said main pulse-height selector and the window width of the window of said main pulse-height selector; a lower-limit level of the window of a second subordinate pulse-height selector is set by the lower-limit value of the window of said main pulse-height selector; the window widths of the windows of said first and second subordinate pulse-height selectors are set by a value obtained by potentially dividing the window width of the window of said main pulse-height selector; and said operation unit obtains a value corresponding to the difference between output values from said first and second subordinate pulse-height selectors.

5. The spectrometer according to claim 2, wherein an upper-limit level of the window of a first subordinate pulse-height selector of said plurality of subordinate pulse-height selectors is set by an upper-limit value of the window of said main pulse-height selector; a lower-limit level of the window of a second subordinate pulse-height selector is set by a lower-limit value of the window of said main pulse-height selector; the window widths of the windows of said first and second subordinate pulse-height selectors are capable of being set at will; and said operation unit obtains a value corresponding to the difference between output values from said first and second subordinate pulse-height selectors.

6. The spectrometer according to claim 2, wherein an upper-limit level of the window of a first subordinate pulse-height selector and the lower-limit level of the window of a second subordinate pulse-height selector of said plurality of subordinate pulse-height selectors are set by an average value and half-value width of a pulse-height distribution; the window widths of the windows of said first and second subordinate pulse-height selectors are capable of being set at will; and said operation unit obtains a value corresponding to the difference between output values from said first and second subordinate pulse-height selectors.

7. The spectrometer according to claim 2, wherein an upper-limit level of the window of a first subordinate pulse-height selector and a lower-limit level of the window of a second subordinate pulse-height selector of said plurality of subordinate pulse-height selectors are set by an average value of a pulse-height distribution and the window width of the window of said main pulse-height selector; the window widths of the windows of said first and second subordinate pulse-height selectors are capable of being set at will; and said operation unit obtains a value corresponding to the difference between output values from said first and second subordinate pulse-height selectors.

8. The spectrometer according to claim 2, wherein the value corresponding to the difference between the output values of said first and second subordinate pulse-height selectors is a differential output obtained by subjecting the output values of said first and second subordinate pulse-height selectors to a frequency-voltage conversion.

9. The spectrometer according to claim 1, wherein said subordinate pulse-height selector has an upper-limit value of the window of said main pulse-height selector, and a window width capable of being set at will, and said operation unit obtains a value corresponding to the difference between the output value of said pulse-height selector and a set value or already measured value.

10. The spectrometer according to claim 1, wherein said subordinate pulse-height selector has an upper-limit value of the window of said main pulse-height selector, and a window width capable of being set at will, and said operation unit obtains a value corresponding to the difference between the output value of said subordinate pulse-height selector and a set value or already measured value.

11. The spectrometer according to claim 1, wherein said subordinate pulse-height selector is set by an average value of a pulse-height distribution in said main pulse-height selector and a window width capable of being set at will, and said operation unit obtains a value corresponding to the difference between the output value of said subordinate pulse-height selector and a set value or already measured value.

12. An X-ray spectrometer, which comprises:
(a) a main pulse-height selector for selecting the pulse height of output pulses from a proportional counter tube;
(b) means for counting the output pulses and converting them into a signal indicative of X-ray intensity; and
(c) a compensator for compensating for the effects of an energy shift in said proportional counter tube; said compensator including:
(i) a subordinate pulse-height selector having a window set within the range of the width of a window of said main pulse-height selector; and
(ii) an operation unit for correcting, by said subordinate pulse-height selector, the means which counts the output pulses and converts them into a signal indicative of X-ray intensity.

13. The spectrometer according to claim 12, wherein said operation unit includes a correction table.

* * * * *